United States Patent [19]
Lin

[11] Patent Number: 4,962,943
[45] Date of Patent: Oct. 16, 1990

[54] STABILIZER BAR UNIT THE TORSION TO THE WHEELS OF WHICH IS CAPABLE OF BEING AUTOMATICALLY ADJUSTED

[76] Inventor: Chien-Hung Lin, No. 150, Chung-Hsiao Rd., Chia-Li Chen, Tainan Hsien, Taiwan

[21] Appl. No.: 429,080

[22] Filed: Oct. 30, 1989

[51] Int. Cl.$^5$ ............................................. B60G 11/26
[52] U.S. Cl. ..................................... 280/707; 280/723
[58] Field of Search ........................ 280/707, 723, 721

[56] References Cited
U.S. PATENT DOCUMENTS

| | | | |
|---|---|---|---|
| 3,504,930 | 4/1970 | Kozowyk et al. | 280/723 |
| 4,206,935 | 6/1980 | Sheppard et al. | 280/723 |
| 4,600,215 | 7/1986 | Kuroki et al. | 280/707 |
| 4,674,767 | 6/1987 | Kuroki et al. | 280/707 |
| 4,804,198 | 2/1989 | Imai et al. | 280/723 |
| 4,827,416 | 5/1989 | Kawagoe et al. | 280/707 |

Primary Examiner—Kenneth R. Rice

[57] ABSTRACT

A stabilizer bar unit for an automobile includes a stabilizer bar connected to the control arms of two aligned wheels of the automobile at two ends thereof. A cylindrical sleeve coaxially surrounds the intermediate portion of the bar in such a manner that two sealed annular chambers are formed in two end portions of the sleeve. Two movable rings are received movably within the chambers and have splined inner surfaces engaged with the splined outer surface of the intermediate portion of the bar, and splined outer surfaces engaged with the splined inner surface of the sleeve. The piston rod of a pivotally mounted hydraulic cylinder is connected rotatably to the sleeve. A hydraulic liquid is supplied from a reservoir to the cylinder through a conduit unit. An automatically controlled switch is disposed on the conduit unit so as to stop the intercommunication between the reservoir and the cylinder when the automobile is steered, accelerated or braked. An automatic control system moves the rings outward in response to the increase in the rotational speed of the wheels and moves the rings inward in response to the reduction of the rotational speed of the wheels. The portion of the bar between the rings cannot be twisted.

1 Claim, 3 Drawing Sheets

STABILIZER BAR UNIT THE TORSION TO THE WHEELS OF WHICH IS CAPABLE OF BEING AUTOMATICALLY ADJUSTED

BACKGROUND OF THE INVENTION

This invention relates to a stabilizer bar unit for an automobile, more particularly to an improved stabilizer bar unit the torsion to the wheels of which can be automatically adjusted.

A so-called "independent front suspension" is used on most passenger cars and light-duty trucks. FIG. 1 shows an independent front suspension assembly which includes two shock absorbers 11, two coil springs 12 and a generally U-shaped stabilizer bar 13. The bar 13 is secured to two control arms 14 at two ends thereof and has an intermediate portion which is journalled on the automobile frame by two bushings 15. When the automobile is steered, or when one of the automobile's front wheels abruptly rolls over a bump, the stabilizer bar can minimize the sway of the automobile. The torsion of the bar 13 is fixed to the front wheels. A slim bar 13 maintains riding comfort, but does not sufficiently prevent the sway of the automobile. On the other hand, an adequately thickened bar 13 provides a satisfactory anti-sway effect, however, the occupants in the automobile are greatly discomforted when the automobile travels over an uneven road.

SUMMARY OF THE INVENTION

It is therefore the main object of this invention to provide an automobile stabilizer bar u nit the torsion to the wheels of which can be automatically adjusted according to the road conditions encountered so as to offer a comfortable ride and a driving safety to the occupants of the automobile.

According to this invention, a stabilizer bar unit for an automobile includes a generally U-shaped stabilizer bar connected to the control arms of two aligned wheels of the automobile at two ends thereof. A cylindrical sleeve coaxially surrounds the intermediate portion of the bar in such a manner that two sealed annular chambers are formed in two end portions of the sleeve. Two movable rings are received movably within the chambers and have splined inner surfaces engaged with the splined outer surface of the intermediate portion of the bar, and splined outer surfaces engaged with the splined inner surface of the sleeve. The piston rod of a pivotally mounted hydraulic cylinder is connected rotatably to the sleeve. A hydraulic liquid is supplied from a reservoir to the cylinder through a conduit unit. An automatically controlled switch is disposed on the conduit unit so as to stop the intercommunication between the reservoir and the cylinder when the automobile is steered, accelerated or braked. An automatic control system moves the rings outward in response to the increase in the rotational speed of the wheels and moves the rings inward in response to the reduction of the rotational speed of the wheels. The portion of the bar between the rings cannot be twisted.

BRIEF DESCRIPTION OF THE DRAWINGS

Other features and advantages of this invention will become apparent in the following detailed description of a preferred embodiment of this invention, with reference to the accompanying drawings in which.

DETAILED DESCRIPTION OF THE PREFERRED EMBODIMENT

Figure 2:
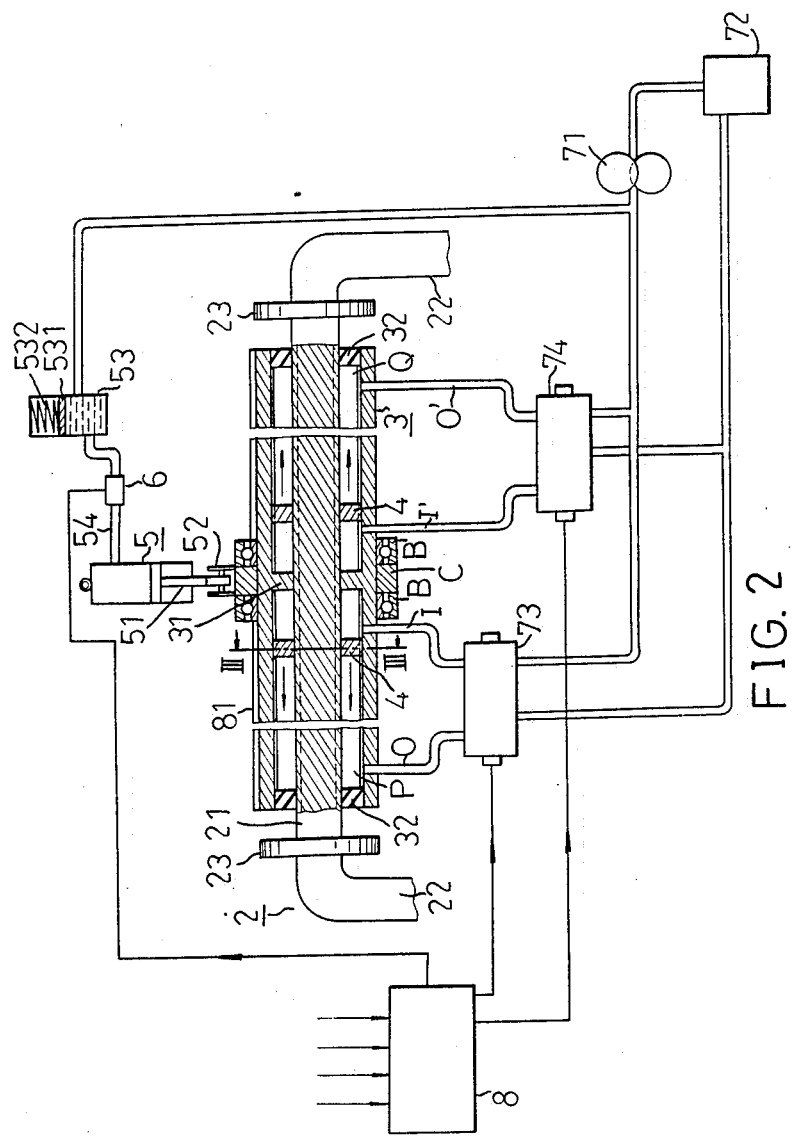
FIG. 2 is a schematic view of a stabilizer bar unit according to this invention.

Referring to FIG. 2, a stabilizer bar unit of this invention includes a generally U-shaped stabilizer bar 2, a cylindrical sleeve 3, two movable rings 4, a hydraulic cylinder 5, an automatically controlled switch 6 and an automatic control system 7.

Figure 1:
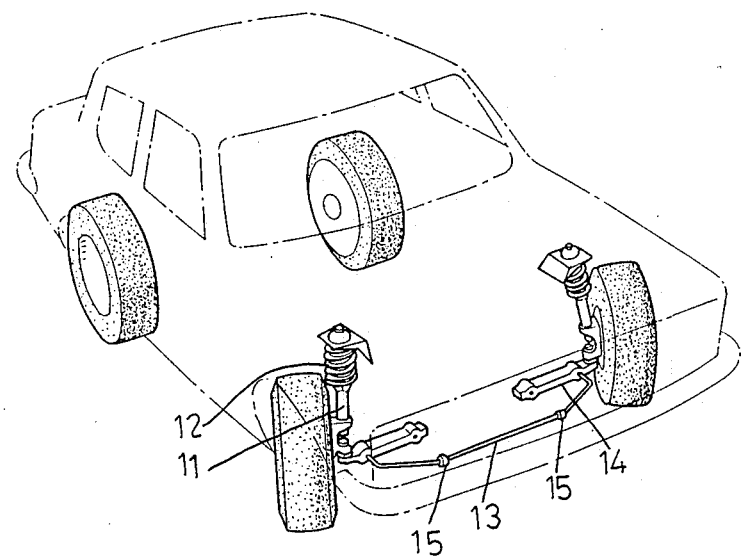
FIG. 1 is a schematic view illustrating the arrangement of a conventional stabilizer bar unit in an automobile.
Figure 3:
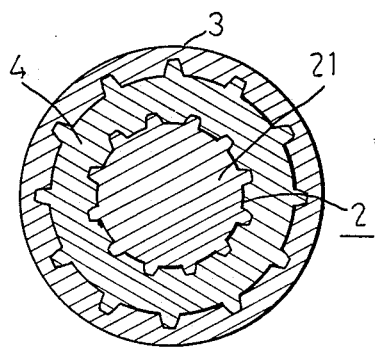
FIG. 3 is a sectional view taken along Line III—III in FIG. 2.

The stabilizer bar 2 is made of a metal, such as spring steel, and has a horizontal intermediate portion 21 and two inclined end portions 22. The end portions 22 of the stabilizer bar 2 are connected to the control arms of the wheels in a known manner. The intermediate portion 21 of the stabilizer bar 2 is journalled on the automobile frame by two bearings 23 and extends through the sleeve 3. An annular interior partition 31 is integrally formed with the middle portion of the sleeve 3 in such a manner that a liquid-tight seal is established therebetween. Two ring seals 32 close two ends of the sleeve 3 so as to form two sealed annular chambers (P, Q) in the sleeve 3. As shown in FIG. 3, the rings 4 have splined outer surfaces engaged with the splined inner surface of the sleeve 3, and splined inner surfaces engaged with the splined outer surface of the stabilizer bar 2 so as to prevent the intermediate portion 21 of the stabilizer bar 2 between the rings 4 from being twisted.

The cylinder 5 is mounted pivotally on the automobile frame at the upper end thereof and can rotate about a horizontal axis. The piston rod 51 extends through the lower end of the cylinder 5 to be connected rotatably to an annular connector (C) by a pivot pin 52. The sleeve 3 is journalled on two bearings (B) which are carried on the connector (C).

A hydraulic liquid is supplied from a reservoir 53 to the cylinder 5 through a conduit unit 54. A movable seal 531 is disposed in the reservoir 53 and is biased by a spring 532 to urge the hydraulic liquid from the reservoir 53 to the cylinder 5. The automatically controlled switch 6 is disposed on the conduit unit 54 and is connected to a logic circuit control unit 8 which includes a plurality of sensors (not shown) assigned to the wheels, the automobile frame, etc. In a situation where the automobile advances at a constant speed along a generally straight path, the switch 6 is automatically turned on to allow intercommunication between the reservoir 53 and the cylinder 5. When the automobile is steered, accelerated or braked, the switch 6 is automatically turned off to stop the intercommunication between the reservoir 53 and the cylinder 5.

The automatic control system 7 includes a pump 71 which forces the hydraulic liquid from a tank 72 to the reservoir 53, as well as a first valve 73 and a second valve 74. Two conduits (I, 0) respectively intercommunicate the first valve 73 and the left chamber (P) in the sleeve 3, while another two conduits (I', 0') intercommunicate the second valve 74 and the right chamber (Q). The hydraulic liquid from a first set of conduits (I, I') moves the movable rings 4 outward, while the hydraulic liquid from a second set of conduits (0, 0') moves the movable rings 4 inward.

Figure 4:
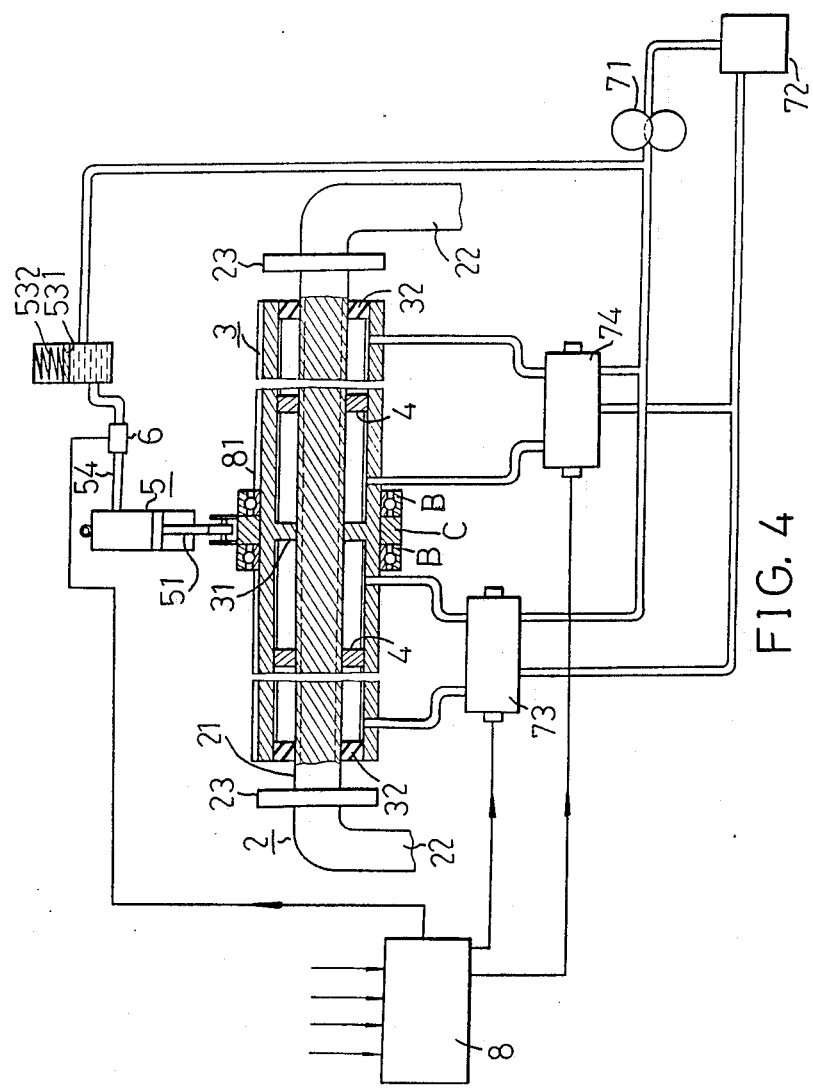
FIG. 4 is a schematic view illustrating the movement of the movable rings of the stabilizer bar unit according to this invention.

Accordingly, the left ring 4 can be moved between the upper ends of two of the conduits (I, 0), while the right ring 4 can be moved between the upper ends of the another two of the conduits (I', 0'). The first valve 73 and the second valve 74 are connected to the logic circuit control unit 8. Referring to FIG. 4, when the rotational speed of the automobile wheels is increased, the movable rings 4 are moved outward. On the other hand, when the rotational speed of the automobile wheels is decreased, the movable rings 4 is moved inward.

A position-sensing unit 81 is installed on the outer surface of the sleeve 3 so as to sense the positions of the movable rings 4 in the sleeve 3. The valves 73, 74 are opened to move the movable rings 4 in response to the signal of the position-sensing unit 81 until the movable rings 4 reach their preset positions. When the automobile is accelerated, the movable rings 4 are moved outward so as to shorten the segment of the intermediate portion 21 of the stabilizer bar 2 which can be twisted, thereby increasing the potential torsion of the stabilizer bar 2 to the wheels. However, in a case where the automobile is decelerated, the potential torsion of the stabilizer bar 2 to the wheels is reduced. In this way, the spring action of the stabilizer bar 2 can be automatically adjusted according to the road conditions encountered by the automobile.

With this invention thus explained, it is apparent that numerous modifications and variations can be made without departing from the scope and spirit of this invention. It is therefore intended that this invention be limited only as indicated in the appended claims.

I claim:

1. An automobile having a frame, two aligned wheels and a stabilizer bar unit associated with said wheels, each of said wheels including a control arm secured thereto, said stabilizer bar unit comprising:

a generally U-shaped stabilizer bar having a horizontal intermediate portion journalled on said frame, and two inclined end portions respectively connected to said control arms, said intermediate portion of said stabilizer bar having a splined outer surface;

a cylindrical sleeve having a splined inner surface, coaxially surrounding said intermediate portion of said stabilizer bar in such a manner that two sealed annular chambers are formed in two end portions of said sleeve;

two movable rings respectively and movably received within said two sealed annular chambers, each of said movable rings having a splined inner surface engaged with said splined outer surface of said intermediate portion of said stabilizer bar so as to prevent relative rotation between said movable ring and said intermediate portion of said stabilizer bar, and a splined outer surface engaged with said splined inner surface of said sleeve so as to prevent relative rotation between said movable ring and said sleeve;

a hydraulic cylinder, mounted pivotally on said frame at one end thereof, rotatable about a horizontal axis, having a piston rod extending through the other end of said hydraulic cylinder, said piston rod being connected pivotally to said cylindrical sleeve;

a hydraulic liquid reservoir disposed on said frame containing an amount of said liquid therein;

a conduit unit intercommunicating said hydraulic cylinder and said reservoir;

an automatically controlled switch, disposed on said conduit unit, capable of being automatically turned on to allow intercommunication between said reservoir and said hydraulic cylinder when said automobile advances at a constant speed along a generally straight path, capable of being automatically turned off to stop the intercommunication between said reservoir and said hydraulic cylinder when said automobile is steered, accelerated or braked; and an automatic control system, capable of moving said movable rings outward when rotational speed of said wheels increases, and capable of moving said movable rings inward when said rotational speed of said wheels reduces;

whereby, the greater the distance between said movable rings, the greater the potential torsion of said stabilizer bar to said wheels.

* * * * *